United States Patent
Kennedy, Jr.

(10) Patent No.: US 11,042,559 B2
(45) Date of Patent: *Jun. 22, 2021

(54) LIGHT DATA INTEGRATION

(71) Applicant: Vinyl Development LLC, Miami Beach, FL (US)

(72) Inventor: Thomas R. Kennedy, Jr., Miami Beach, FL (US)

(73) Assignee: Vinyl Development LLC, South Harwich, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,206

(22) Filed: Mar. 31, 2017

(65) Prior Publication Data

US 2017/0270173 A1 Sep. 21, 2017

Related U.S. Application Data

(63) Continuation of application No. 14/963,562, filed on Dec. 9, 2015, now Pat. No. 9,613,108.

(51) Int. Cl.
G06F 16/25 (2019.01)

(52) U.S. Cl.
CPC .................................. G06F 16/25 (2019.01)

(58) Field of Classification Search
None
See application file for complete search history.

(56) References Cited

U.S. PATENT DOCUMENTS

| | | | |
|---|---|---|---|
| 6,381,611 B1 | 4/2002 | Roberge | |
| 6,990,680 B1 | 1/2006 | Wugofski | |
| 9,613,108 B1 | 4/2017 | Kennedy, Jr. | |
| 2003/0064705 A1 | 4/2003 | Desiderio | |
| 2004/0255150 A1 | 12/2004 | Sezan | |
| 2005/0171934 A1 | 8/2005 | Yuknewicz | |
| 2006/0230032 A1 | 10/2006 | Brankov | |
| 2008/0256080 A1 | 10/2008 | Irvin | |
| 2010/0077007 A1 | 3/2010 | White | |
| 2012/0185509 A1* | 7/2012 | Flasko | G06F 21/6227 707/784 |
| 2012/0310878 A1 | 12/2012 | Vuksan | |

(Continued)

OTHER PUBLICATIONS

International Search Report and Written Opinion for corresponding PCT Appl No. PCT/US16/65720, dated Jan. 12, 2017.

*Primary Examiner* — Thu N Nguyen
(74) *Attorney, Agent, or Firm* — Fish & Richardson P.C.

(57) ABSTRACT

Methods, systems, and apparatus, including computer programs encoded on computer storage media, for a light integration. One of the methods includes receiving a plurality of objects from a functional logic tier of an application, each object representative of data stored in a data tier of the application, a first portion of the stored data being stored in a first persistent data store and a second portion of the stored data being stored in a second persistent data store. The method includes presenting in a first area of the user interface information from the plurality of objects, the information selected from the first portion of the data. The method includes receiving an indication of an object being selected from the plurality of objects. The method includes presenting in a second area of the user interface information from the second part of data corresponding to the selected business object.

21 Claims, 8 Drawing Sheets

(56) References Cited

U.S. PATENT DOCUMENTS

| | | |
|---|---|---|
| 2013/0047113 A1 | 2/2013 | Hume |
| 2013/0166598 A1* | 6/2013 | Vaitheeswaran ...... G06F 16/256 |
| | | 707/792 |
| 2013/0238627 A1 | 9/2013 | Qian |
| 2014/0122523 A1* | 5/2014 | Aggarwal ......... G06F 17/30525 |
| | | 707/769 |
| 2014/0149400 A1* | 5/2014 | Fu .................... G06F 17/30575 |
| | | 707/723 |
| 2014/0181013 A1 | 6/2014 | Micucci |
| 2015/0039906 A1 | 2/2015 | Kolesnik |
| 2016/0026715 A1* | 1/2016 | Bilenko .............. H04L 67/1097 |
| | | 707/711 |
| 2016/0063119 A1* | 3/2016 | Tevnan ............... G06F 16/9535 |
| | | 717/130 |

\* cited by examiner

LIGHT DATA INTEGRATION

CROSS-REFERENCE TO RELATED APPLICATIONS

This application is a continuation of, and claims priority under 35 USC 120 to, U.S. application Ser. No. 14/963,562, filed on Dec. 9, 2015. The contents of this application is hereby incorporated by reference in its entirety.

BACKGROUND

Data integration refers to a process of combining data residing in different sources and providing a unified view of the data. This process becomes significant in a variety of situations, which include both commercial (when two similar companies need to merge their databases) and scientific (combining research results from different bioinformatics repositories, for example) domains.

SUMMARY

In general, one innovative aspect of the subject matter described in this specification can be embodied in methods that include the actions of receiving, by a computer device, executing at least part of a functional logic tier of an application, a request from a user for one or more objects present in the functional logic tier. The methods include the actions of determining that a type of one of the one or more requested objects is associated with an object representative of instance level security. The methods include the actions of determining access is authorized to at least some of the one or more objects in response to determining that the type is associated with the object representative of instance level security, determining access including accessing, by a computer device executing at least part of a data tier of the application, a link data structure in the data tier of the application that links the access authorized user with at least some of the one or more objects. The methods also include the actions of providing the at least some of the one or more objects to the access authorized user.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Multiple objects representative of instance level security may be associated with the link data structure. Multiple objects representative of instance level security may be associated with the same type of object. The object representative of instance level security may be associated with a name and wherein determining the user is authorized to access at least some of the one or more objects is based at least in part on the name. Securing the object using the object representative of instance level security may not require change to a user interface accessing the business object. The link data structure may be a table in a relational database. The methods may include the actions of storing a key references the first portion of the data in the second portion of the data.

Particular embodiments of the subject matter described in this specification can be implemented so as to realize one or more of the following advantages. Objects can be secured at the instance level. Row level security can be implemented at the data and object level without requiring adjustment to the presentation tier.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

User interfaces can be implemented using data from multiple data sources. Organizations tend to store information in many disparate data sources. These data sources can include relational databases, enterprise products, data warehouses, and cloud based data systems. This use of disparate data sources can arise for many reasons, including the continued use of older systems, the selection of disparate "best in class" systems for different functionality, newer systems potentially being built that use newer technology while older systems remain, third party products being potentially purchased but perhaps not offering the complete suite of functionality desired by an organization, etc.

Figure 1:
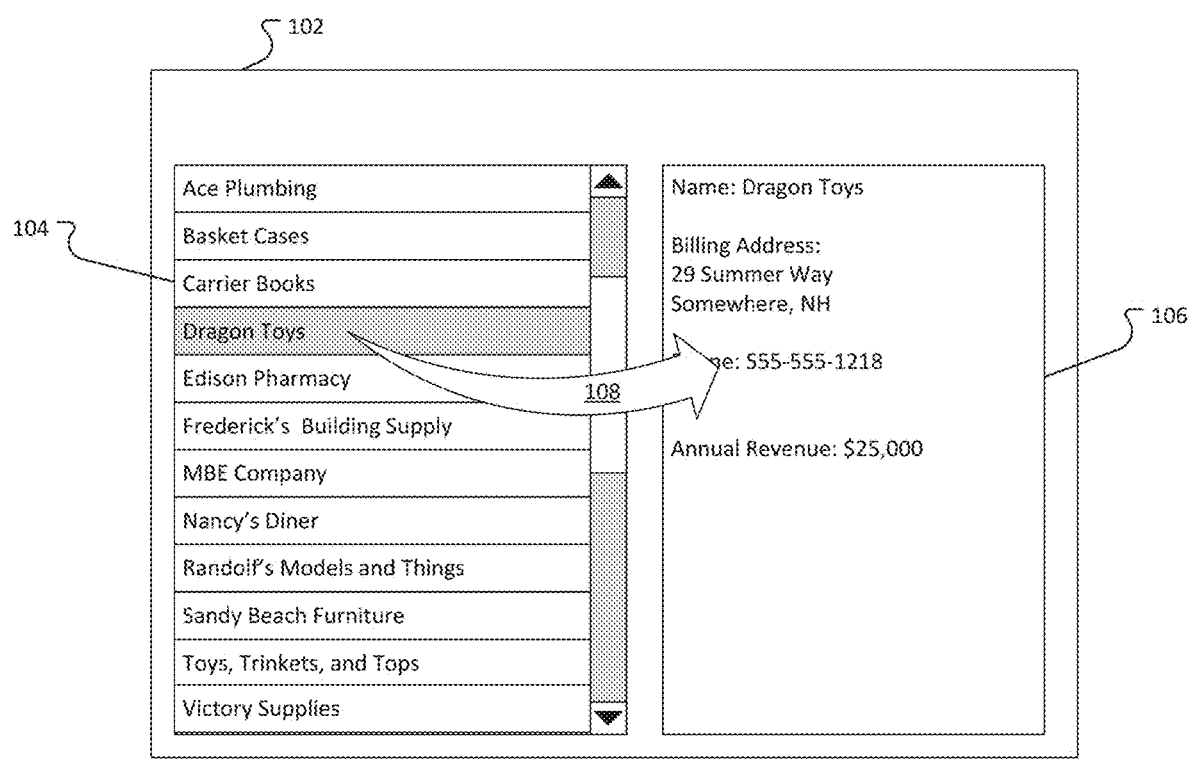
FIG. 1 illustrates an example of a user interface.

FIG. 1 illustrates an example user interface 102 includes a first panel 104 and a second panel 106. The first panel 104 includes a list of items and the second panel 106 displays information about a selected item in the list on the first panel 104 (the selection being graphically represented by an arrow 108). The example in FIG. 1 illustrates the first panel 104 as containing a list box. A list box can be considered a graphical control element that allows a user to select one or more items from a list contained within a static, multiple line text box. Other graphical controls that allow a user to select an item from a predetermined list can be used and are consistent with the example. For example, the user may select from a drop-down list, which is a graphical control element similar to a list box that allows the user to choose one value from a list. When a drop-down list is inactive, it displays a single value. When it is activated, it displays (drops down) a list of values from which the user may select one value. When the user selects a new value, the control reverts to its inactive state, displaying the selected new value.

Complexity is introduced when the data used to generate the list in the first panel 104 is stored, at least in part, in a data store that is separate from the data store that contains the information presented in the second panel 106.

Figure 2:
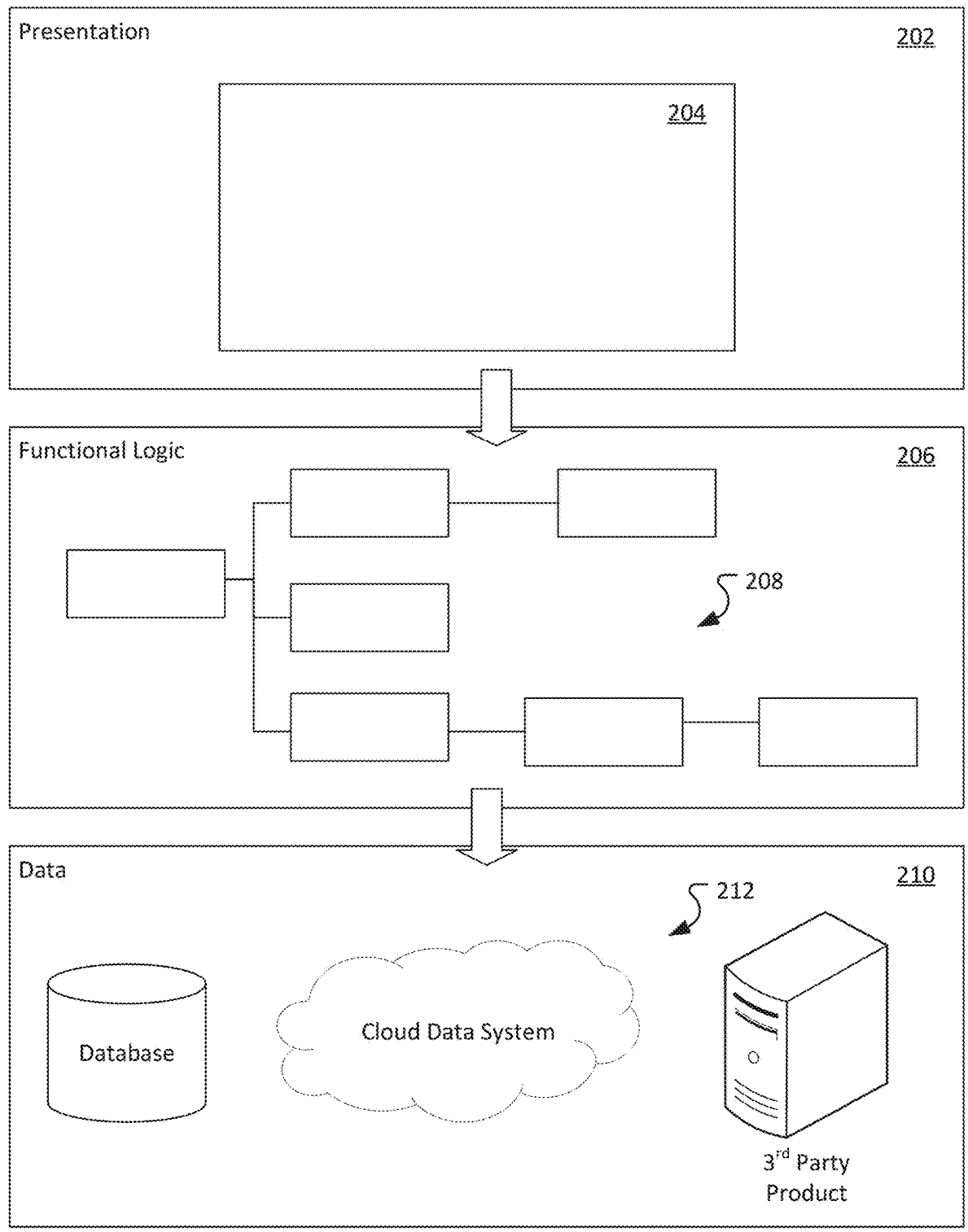
FIG. 2 illustrates an example of a three-tier architecture.

FIG. 2 illustrates an example of a three-tier architecture. In general, a multi-tier architecture can be a client-server architecture in which presentation, application processing, and data management functions are physically separated. One often-implemented multi-tier architecture is the three-tier architecture. Three-tier architecture is a client-server architecture in which a presentation tier 202 (for example, user interface 204), functional logic tier 206 (for example, an object model 208), and data architecture tier 210 (for example, data storage systems 212) are developed and maintained as independent modules, frequently on separate platforms.

In some arrangements, the presentation tier 202 can be the top-level of an application. The main function of the presentation tier can be to translate business processes into a form the user can understand. The functional logic tier 206 can coordinate the application, process commands, perform calculations, etc. and make logical decisions, evaluations, etc. The data tier 210 often coordinates the storage and retrieval of data from one or more data storage systems.

In general, each tier of the architecture interacts with one of the other tiers (e.g., one adjacent tier). In this example, a tier may interaction with the tier that is graphically represented as being directly below it. As such items in a tier can interact with items in the tier directly below. For example, the user interface 204 may access the object model 208. Further, the object model 208 can access a function provided by the data storage systems 212. The user interface 204, however, would generally not interact with the data storage systems 212 directly, as the data storage systems 212 is not directly below the user interface 204, in this example.

Different types of developers may focus on different tiers. For example, GUI designers and web developers may focus on the presentation tier 202. Application developers and business architects may focus on the functional logic tier 206. Database administrators and database programmers may focus on the data tier 210. In some scenarios, certain types of developers may focus on multiple tiers. For example, security can be an enterprise specialty that influences each of the tiers mentioned above.

Figure 3:
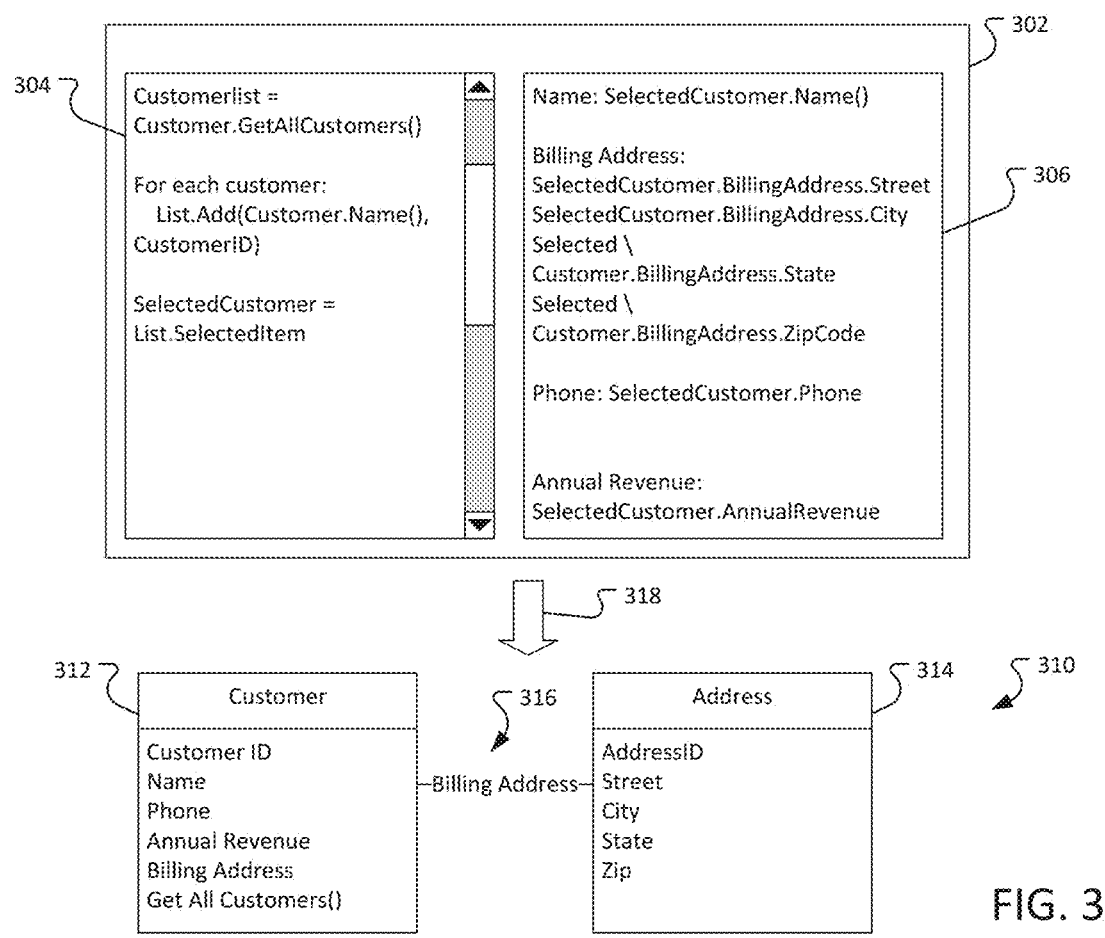
FIG. 3 illustrates an example of a user interface operating in a presentation tier accessing objects in a functional logic tier.

FIG. 3 illustrates an example of a user interface 302 in a presentation tier that is accessing objects in a functional logic tier. The user interface 302 includes a first panel 304 and a second panel 306. The first panel 304 and the second panel 306 present pseudo code, which when executed, would then populate panel 304 with a customer list—from which a customer can be selected, and populate panel 306 with information (address, phone number, etc.) for the selected customer.

A customer object 312 and an address object 314 reside in the functional logic tier of the application, which is located below the presentation tier as graphically represented by an arrow 318. Links can form among objects that reside in these tiers, such as the customer object 314 and the address object 314. For example, a relationship 316 exists between the customer object 312 and the address object 314, which can be used to identify the billing address of a particular customer.

One technique used in developing applications in the functional logic tier is object-oriented programing. Object-oriented programing a class or type of an object represents the object generally (herein referred to a class of type). A class of type of the object may be a customer or a product. This is distinguished from an object or instance, which references a particular thing. An instance may represent the customer "John Smith" or the product "Pet Rock." (herein referred to as an object or instance).

Based upon the presentation tier being position above the functional logic tier in this example, the user interface 302 can access the objects 312, 314. To access the objects, one or more techniques may be employed, for example, the first panel 304 (of the user interface 302 which may be user interface 102 of FIG. 1) may include pseudo code sufficient to generate a list of customers (for example, the list of customers in the first panel 104 of FIG. 1). In order to populate the first panel 304 of the user interface 302, the user interface may access the customer object 312. In this example, a GetAllCustomers( )method on the customer object 312 can be used to obtain a list of all customers. The application iterates over the list of returned customers and adds the name of each customer to the list presented in the first panel 304. The pseudo code also allows for a customer to be selected from the list of customers.

The second panel 306 includes pseudo code sufficient to populate the second panel with information about the customer object 312. In this example, the second panel 306 is populated with the name of the customer selected from the customer list in panel 304. The pseudo code 306 includes instructions that use the relationship 316 to navigate from the object 312 of the selected customer to identify a billing address provided by the address object 314 shows the navigation of the billing address relationship 316 in order to identify the billing address 314 for the selected customer. The second panel 306 is populated with the street, city, state, and zip code of the billing address. The second panel 306 is also populated with the selected customer's phone number and annual revenue.

Developing a user interface by using these objects allows a developer to produce a user interface without regard for where the underlying data is stored. Instead, coordinating between the objects and the persistent data is relegated to the functional object and data tiers.

Figure 4:
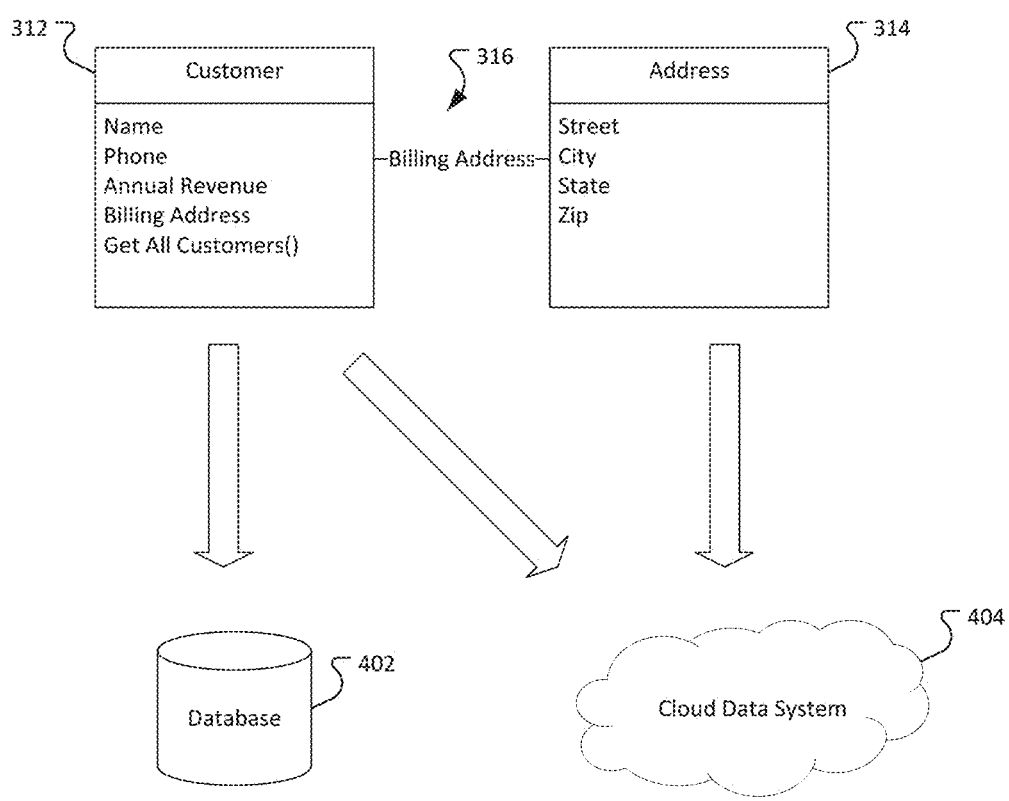
FIG. 4 illustrates an example of a functional logic tier interacting with a data tier.

FIG. 4 illustrates an example of a functional logic tier (e.g., the tier 206 of FIG. 2) interacting with a data tier (e.g., the tier 210 of FIG. 2). The arrangements of data on the object may be determined based on the logical location of the data according to the object model (e.g., the object model 208 of FIG. 2) and not based on the location of the data in the data storage systems. For example, the customer object 312 may include the name, phone, and annual revenue of the customer while the address object 314 may include the street, city, state, and zip code. The data may not be persistently stored, however, in a manner consistent with the model, for example, the data for a particular object may be stored across multiple databases. In this example, the customer list may be available from a relational database 402, while the attributes of the customers and the customer addresses may be stored on in a cloud data system 404. For example, customer information (e.g., customer attribute, address information, etc.) may be stored in an account object of a SALESFORCE database.

The functional logic tier can provide a mapping that allows the system to convert vendor specific data types to vendor neutral data types. The functional logic tier also allows for conversions between some logical datatypes. For example, mapping between a relatively small, finite set of vendor-neutral datatypes is more efficient and requires less programing effort that mapping between a relatively large, unbound set of vendor specific data-types.

While the following example refers to a relational database and a cloud data system, other data storage systems can be used. For example, one or more key-based storage systems may be employed to provide a data storage system. Data storage systems can include, but are not limited to, indexed flat files, relational databases, and NoSQL databases (including but not limited to column data stores (such as HBASE), document databases (such as APACHE COUCHDB), key value databases (such as ORACLE NOSQL DATABASE), graph databases (such as ALLEGRO), and/or a multi-model data stores (such as FOUNDATION DB)). The data storage systems may be, for example, located within an organization or may be provided as a cloud based service.

Figure 5:
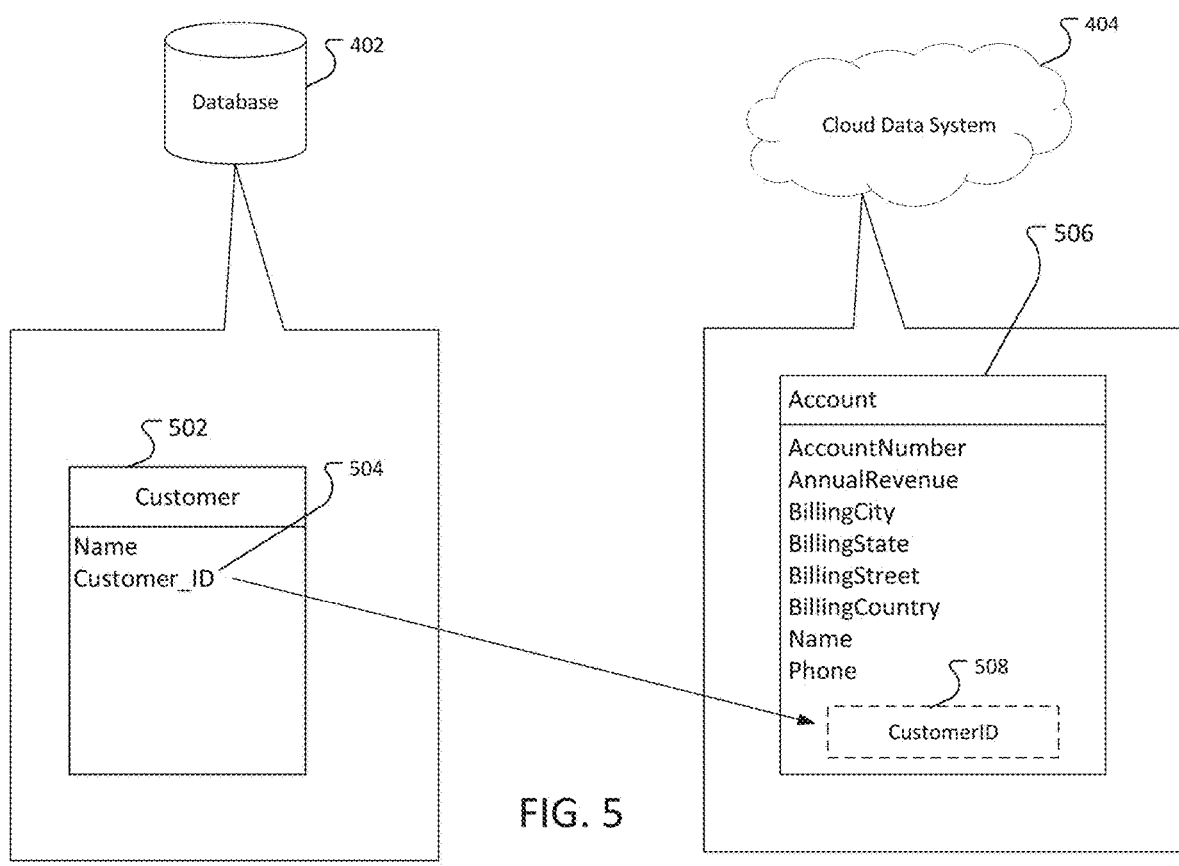
FIG. 5 illustrates an example of a data tier.

FIG. 5 illustrates an example of a data tier (e.g., the data tier 210 shown in FIG. 2) that includes the database 402 and the cloud data system 404. The database 402 can be, for example, a relational database stored on a data server. The cloud data system 404 can be, for example, a third party product, such as SALESFORCE.

In this example, the database 402 includes a table definition of a customer table 502. The table definition customer table includes a table definition that provides the name of two columns in the customer table: a name column and a customer ID column 504.

In this example, the cloud data system 404 includes an account object 506. The inner workings of the cloud data system 404 may be unknown or hidden. Instead, the cloud data system may be accessed using an application programming interface (API). In this example, the account object 506 includes account number, annual revenue, billing city, billing state, billing street, billing country, name, and phone fields.

In general, objects in the cloud data system 404 may not use the same identification fields (sometimes referred to as primary keys) as the database 402. Generally, there may be no mapping between the cloud data system 404 and the database 402.

Furthermore, as many data storage systems do not support the SQL query language, federated query systems may be unable to join data across the database. For example, SALESFORCE uses the account object 506 to represent customers. The internal account id, which identifies an account, is not generally coordinated with the customer ID column 504. One way to associate data records across disparate systems is to store an identifier in one system that references the corresponding record in the other system. For example, values from the customer ID column 504 can be copied (as shown by the customer field 508) and stored in the account object 506, thereby enabling a system to navigate between the account object 506 and the customer table 502.

Figure 6:
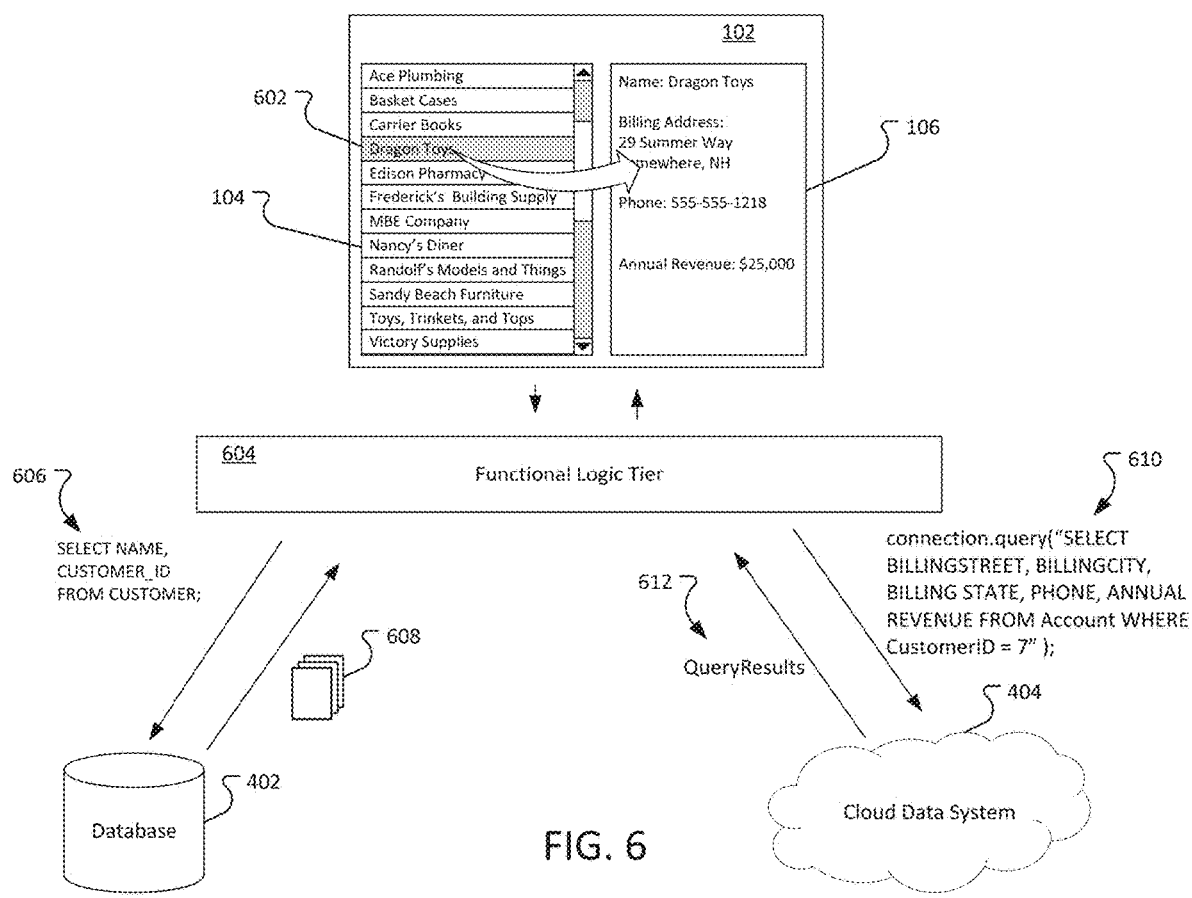
FIG. 6 illustrates an example of light integration between data sources.

FIG. 6 illustrates an example of light integration between data sources. In general, light integration is a technique that can provide the benefits of federated queries without having the same overhead cost.

The user interface 102, as describe above with respect to FIG. 1, includes the first panel 104 and the second panel 106. Data for the first panel 104 may be provided from the database 402 (from FIG. 4). Data for the second panel 106 may be provided by the cloud data system 404 (from FIG. 4) based on information provided by a user interaction with the first panel 104. For example, a user may select an item in the first panel (here the "Dragon Toys" item 602) and the second panel 106 is then populated with information about "Dragon Toys."

As described above, the user interface 102 interacts with functional logic tier 604 (the details of which are omitted here for clarity). The functional logic tier 604 simplifies the light integration of data sources. Light integration can include joining data from two different systems based on one or more common values. The common values can be (and usually are) stored in different, vendor-specific data types. The system is able to map those to vendor-neutral data types and convert the values where necessary.

The functional logic tier 604 in turn causes commands to be executed against the data sources. For example, to provide the data that the user interface 102 uses to populate the first panel 104, the functional logic tier 604 can cause a SQL command 606 (e.g., "SELECT NAME, CUSTOMER ID FROM CUSTOMER") to be sent to the database 402. The database 402 can process the query provided by the command and return a list of records as results. The functional logic tier 604 can provide the details of the results as objects to the user interface 102, which then can use those details to populate the first panel 104.

When the user selects an item in the first panel 104 (in this example, the "Dragon Toys" item 602), the user interface 102 interacts with the functional logic tier 604 to obtain more information about the selected item. For example, the user interface 102 may execute a method on a customer object that causes the customer object to obtain more detail from the data sources. In response, the functional logic tier 604 can cause a query 610 to be executed against the cloud data system 404. In this example, a query is executed using a SALESFORCE API:

connection.query("SELECT BILLINGSTREET, BILLINGCITY, BILLING STATE, PHONE, ANNUAL REVENUE FROM Account WHERE CustomerID=7");

where '7' is the CustomerID associated with the Dragon Toys. The cloud data system 404 processes the received query 610 and generates query results 612. The query results 612 are provided to the functional logic tier 604 and consequently are used by the user interface 102 to populate the second panel 106.

Other types of systems that can be used to connect to cloud data systems include, for example, SOAP calls, remote procedure calls, streaming, OData, REST web services, etc.

Figure 7:
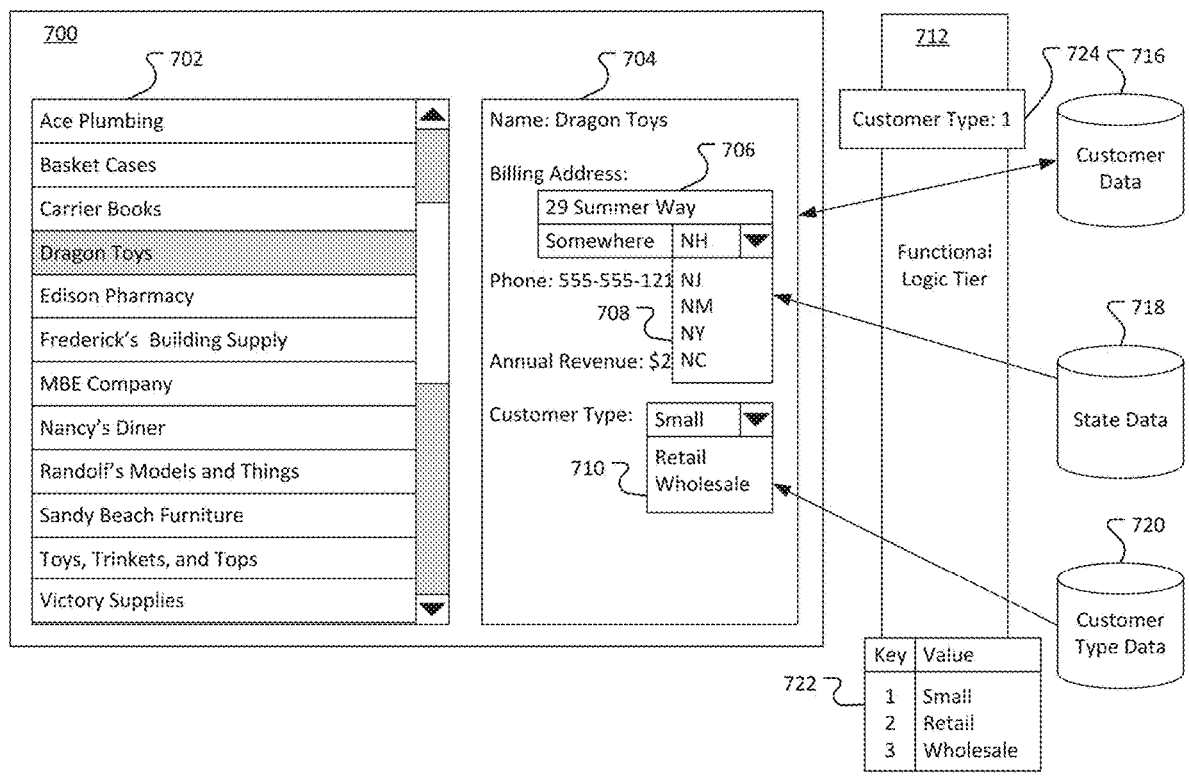
FIG. 7 is an example of a user interface integrating data from multiple data sources.

FIG. 7 is an example of a user interface 700 integrating data from multiple data sources. The user interface 700 includes a first panel 702 and a second panel 704. The first panel 702 includes a list of items and the second panel 704 displays information about a selected item in the list on the first panel 702. In this example, the data displayed in the second panel 704 can be edited.

For example, the second panel 704 includes an editable box 706 where the user can update the street address. The user interface also includes a drop down box 708 where the user may select a state from a list of states. The second panel 704 also includes another dropdown box 710 where the user can select a type of customer from a list of customer types.

As described above, the developer of the user interface 700 interacts with objects or data in the functional logic tier 712. The functional logic tier 712 interacts with the data tier in order to obtain and store the data.

The selectable items in the second panel 704 may be populated using data from different data sources. For example, the drop down box 708 may be populated with a list of states from a state data source 718. The state data source 718 may be a look up table in a relational data base or may be obtained from a third-party service, for example, a web service. Similarly, the customer type drop down 710 may be populated with data from a customer type data source 720. The customer type data source 720 may be, for example, a table in a relational database.

Data values selected from a drop down list can be populated using keys and values. For example, the customer type data source 720 may store a unique key for each type of customer. As represented by the table 722, the number 1 could represent the small customer type. The number 2 could represent the retail customer type. The number 3 could represent the wholesale customer type.

The items in the first panel 702 may be provided from a customer data source 716 and the information about the selected item (e.g. Dragon Toys). For example, the customer data source 716 may store that Dragon Toys' Billing Address is 29 Summer Way in Somewhere, N.H. The customer data source 716 may also store the phone number, annual revenue, and customer type for Dragon Toys. In this example, the data from the drop down list boxes, or any other key value selection control, may be stored as a key. For example, the Dragon Toys customer is associated with the small customer type, which, as described above, is represented by the number 1 in the customer type data source 720. When the Dragon Toys information is stored in the customer data source 716, the number 1 may be stored instead of the term "Small" (as represented by the data value 724). In this manner, keys originating from the customer type data source 720 may be stored in the customer data source 716. Similarly, when displaying the customer information, information from the customer data source 716 may require cross reference with another data source (for example, the state data source 718 or the customer type data source 720).

Figure 8:
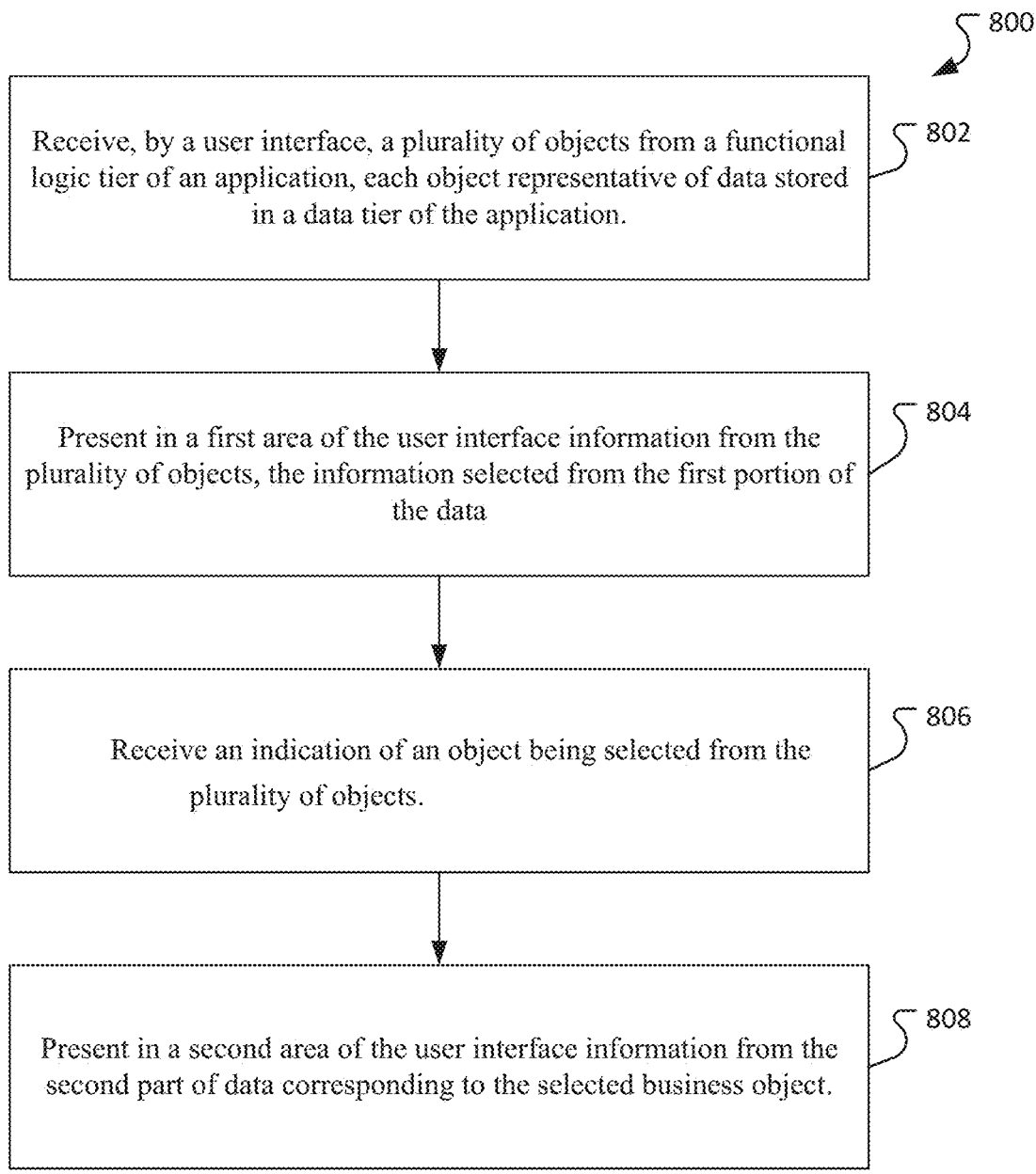
FIG. 8 is a flowchart for an example process for implementing light integration.

FIG. 8 is a flowchart for an example process 800 for light integration. The process 800 may be performed by a computer processing system including one or more computer processors and a non-transitory storage medium storing instructions that cause the computer processing system to execute the process.

The process 800 can receive 802 a plurality of objects from a functional logic tier of an application, each object representative of data stored in a data tier of the application. A first portion of the stored data may be stored in a first persistent data store (for example, a SQL database) and a second portion of the stored data being stored in a second persistent data store (for example, a NoSQL database) different from the first persistent data store.

The process 800 can present 804 in a first area of the user interface information from the plurality of objects, the information selected from the first portion of the data.

The process 800 can receive 806 an indication of an object being selected from the plurality of objects. For example, a user of the user interface may click, touch, or otherwise select a data on the user interface that corresponds to one of the objects in the functional logic tier.

The process 800 can present 808 in a second area of the user interface information from the second part of data corresponding to the selected business object.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions), encoded on computer storage medium for execution by, or to control the operation of, data processing apparatus.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language (including compiled or interpreted languages or declarative or procedural languages) and it can be deployed in any form (including as a stand-alone program or as a module, component, subroutine, object, or other unit suitable for use in a computing environment). A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few). Devices suitable for storing computer program instructions and data include all forms of non-transitory computer-readable media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer that has a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual, auditory, or tactile feedback), and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), a middleware component (e.g., an application server), or a front end component (e.g., a client computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a user interface, a plurality of objects from a functional logic tier of an application, each object representative of data stored in a data tier of the application, a first portion of the stored data being stored in a first persistent data store and a second portion of the stored data being stored in a second persistent data store different from the first persistent data store;
receiving an indication of an object being selected through the user interface from the plurality of objects;
in response to receiving the indication, causing the functional logic tier to:
configure a first query for the first portion of the data represented by the selected object, the first query having a first configuration that is based on a first requirement of querying the first persistent data store;
configure a second query for the second portion of the data represented by the selected object, the second query having a second configuration that is based on a second requirement of querying the second persistent data store, the second requirement being different than the first requirement of querying the first persistent data store, and
obtain, by executing the first query and the second query, the first portion of data from the first persistent data store and the second portion of data from the second persistent data store; and
presenting, in an area of the user interface, information representing the first portion of data and the second portion of data corresponding to the selected object and retrieved from the functional logic tier;
wherein the functional logic tier is configured to map a first data type to a neutral data type based on the first requirement for querying the first persistent data store, and wherein the functional logic tier is configured to map a second data type to the neutral data type based on the second requirement for querying the second persistent data store.

2. The computer-implemented method of claim 1, wherein the first persistent data store is a SQL database and the second data store is a NoSQL database.

3. The computer-implemented method of claim 1, wherein at least one of the first data store and the second data store are selected from a group consisting of a relational database, a cloud database, a column database, a document database, a key value database, a graph database, and a multi-model database.

4. The computer-implemented method of claim 1, wherein the second portion of the data includes a key that references the first portion of the data.

5. The computer-implemented method of claim 1, wherein an interface of the object does not distinguish data based on which persistent data store stores the data.

6. The computer-implemented method of claim 1, further comprising storing a key that references the first portion of the data in the second portion of the data.

7. A non-transitory computer storage medium encoded with computer program instructions that when executed by one or more computers cause the one or more computers to perform operations comprising:
receiving, by a user interface, a plurality of objects from a functional logic tier of an application, each object representative of data stored in a data tier of the application, a first portion of the stored data being stored in a first persistent data store and a second portion of the stored data being stored in a second persistent data store different from the first persistent data store;
receiving an indication of an object being selected through the user interface from the plurality of objects;
in response to receiving the indication causing the functional logic tier to:
configure a first query for the first portion of the data represented by the selected object, the first query having a first configuration that is based on a first requirement of querying the first persistent data store;
configure a second query for the second portion of the data represented by the selected object, the second query having a second configuration that is based on a second requirement of querying the second persistent data store, the second requirement being different than the first requirement of querying the first persistent data store, and
obtain, by executing the first query and the second query, the first portion of data from the first persistent data store and the second portion of data from the second persistent data store; and
presenting, in an area of the user interface, information representing the first portion of data and the second portion of data corresponding to the selected object and retrieved from the functional logic tier;
wherein the functional logic tier is configured to map a first data type to a neutral data type based on the first requirement for querying the first persistent data store, and wherein the functional logic tier is configured to map a second data type to the neutral data type based on the second requirement for querying the second persistent data store.

8. The non-transitory computer storage medium of claim 7, wherein the first persistent data store is a SQL database and the second data store is a NoSQL database.

9. The non-transitory computer storage medium of claim 7, wherein at least one of the first data store and the second data store are selected from a group consisting of a relational database, a cloud database, a column database, a document database, a key value database, a graph database, and a multi-model database.

10. The non-transitory computer storage medium of claim 7, wherein the second portion of the data includes a key that references the first portion of the data.

11. The non-transitory computer storage medium of claim 7, wherein an interface of the object does not distinguish data based on which persistent data store stores the data.

12. The non-transitory computer storage medium of claim 7 further comprising storing a key that references the first portion of the data in the second portion of the data.

13. A system comprising:
one or more computers and one or more storage devices storing instructions that are operable, when executed by the one or more computers, to cause the one or more computers to perform operations comprising:
receiving, by a user interface, a plurality of objects from a functional logic tier of an application, each object representative of data stored in a data tier of the application, a first portion of the stored data being stored in a first persistent data store and a second portion of the stored data being stored in a second persistent data store different from the first persistent data store;
receiving an indication of an object being selected through the user interface from the plurality of objects;
in response to receiving the indication, causing the functional logic tier to:
configure a first query for the first portion of the data represented by the selected object, the first query having a first configuration that is based on a first requirement of querying the first persistent data store;
configure a second query for the second portion of the data represented by the selected object, the second query having a second configuration that is based on a second requirement of querying the second persistent data store, the second requirement being different than the first requirement of querying the first persistent data store, and
obtain, by executing the first query and the second query, the first portion of data from the first persistent data store and the second portion of data from the second persistent data store; and
presenting, in an area of the user interface information representing the first portion of data and the second portion of data corresponding to the selected object and retrieved from the functional logic tier
wherein the functional logic tier is configured to map a first data type to a neutral data type based on the first requirement for querying the first persistent data store, and
wherein the functional logic tier is configured to map a second data type to the neutral data type based on the second requirement for querying the second persistent data store.

14. The system of claim 13, wherein the first persistent data store is a SQL database and the second data store is a NoSQL database.

15. The system of claim 13, wherein at least one of the first data store and the second data store are selected from a group consisting of a relational database, a cloud database, a column database, a document database, a key value database, a graph database, and a multi-model database.

16. The system of claim 13, wherein the second portion of the data includes a key that references the first portion of the data.

17. The system of claim 13, wherein an interface of the object does not distinguish data based on which persistent data store stores the data.

18. The system of claim 13, further comprising storing a key that references the first portion of the data in the second portion of the data.

19. The computer-implemented method of claim 1, further comprising joining the first portion of the stored data being stored in the first persistent data store and the second portion of the stored data being stored in the second persistent data store using a common value referencing the first portion and the second portion, the common value being stored in the first data type in the first persistent data store and the second data type in the second persistent data store.

20. The non-transitory computer storage medium of claim 7, further comprising joining the first portion of the stored data being stored in the first persistent data store and the second portion of the stored data being stored in the second persistent data store using a common value referencing the first portion and the second portion, the common value being stored in the first data type in the first persistent data store and the second data type in the second persistent data store.

21. The system of claim 13, further comprising joining the first portion of the stored data being stored in the first persistent data store and the second portion of the stored data being stored in the second persistent data store using a common value referencing the first portion and the second portion, the common value being stored in the first data type in the first persistent data store and the second data type in the second persistent data store.

\* \* \* \* \*